United States Patent
Zhao

(10) Patent No.: US 10,055,453 B2
(45) Date of Patent: Aug. 21, 2018

(54) INTERACTIVE SEARCHING METHOD AND APPARATUS

(71) Applicant: BAIDU ONLINE NETWORK TECHNOLOGY (BEIJING) CO., LTD., Beijing (CN)

(72) Inventor: Shiqi Zhao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 237 days.

(21) Appl. No.: 14/575,384

(22) Filed: Dec. 18, 2014

(65) Prior Publication Data

US 2016/0012103 A1  Jan. 14, 2016

(30) Foreign Application Priority Data

Jul. 9, 2014 (CN) .......................... 2014 1 0326117

(51) Int. Cl.
*G06F 17/30* (2006.01)

(52) U.S. Cl.
CPC .... *G06F 17/30392* (2013.01); *G06F 17/3064* (2013.01); *G06F 17/30554* (2013.01); *G06F 17/30864* (2013.01); *G06F 17/30867* (2013.01); *G06F 17/30973* (2013.01)

(58) Field of Classification Search
None
See application file for complete search history.

(56) References Cited

U.S. PATENT DOCUMENTS

| | | | | |
|---|---|---|---|---|
| 2003/0217052 | A1* | 11/2003 | Rubenczyk | ....... G06F 17/30643 |
| 2007/0282811 | A1* | 12/2007 | Musgrove | ......... G06F 17/30672 |
| 2009/0144262 | A1 | 6/2009 | White | |
| 2011/0173174 | A1* | 7/2011 | Flitcroft | ............ G06F 17/30864 707/707 |
| 2011/0320470 | A1* | 12/2011 | Williams | .......... G06F 17/30864 707/767 |
| 2012/0121055 | A1 | 5/2012 | Yokoyama | |
| 2013/0017523 | A1* | 1/2013 | Barborak | ................ G09B 7/04 434/322 |

FOREIGN PATENT DOCUMENTS

| | | |
|---|---|---|
| CN | 101118554 A | 2/2008 |
| CN | 101937437 A | 1/2011 |
| CN | 102456018 A | 5/2012 |
| JP | 2009252070 A | 10/2009 |
| WO | 0141002 A1 | 6/2001 |

* cited by examiner

*Primary Examiner* — Mark D Featherstone
*Assistant Examiner* — Ranjit P Doraiswamy
(74) *Attorney, Agent, or Firm* — Hodgson Russ LLP

(57) ABSTRACT

An interactive searching method and apparatus are provided. The interactive searching method includes following steps. A query is obtained, and intention clarification information of the query is generated according to a history search log associated with the query and a predetermined semantic knowledge base to display on a client webpage in which the query is.

9 Claims, 2 Drawing Sheets

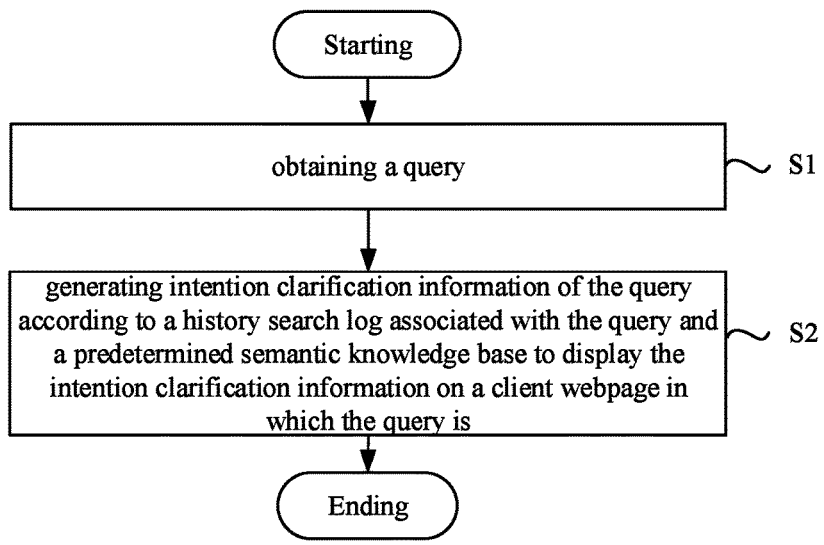
Fig. 1 (Amended)

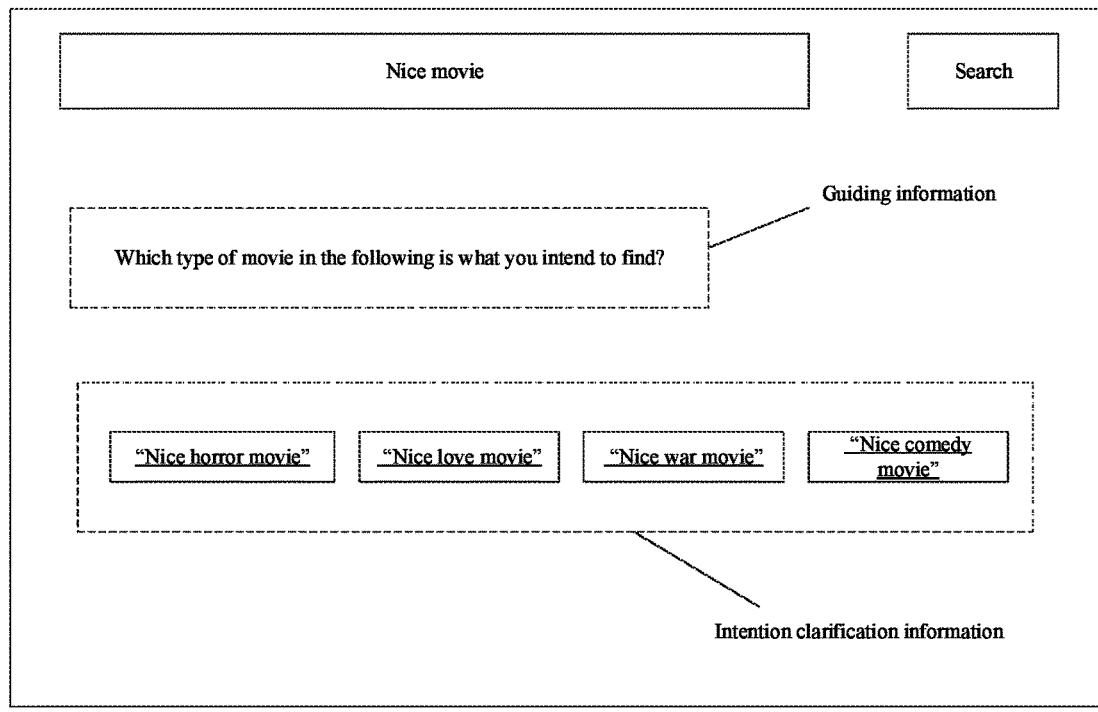
Fig. 3 (Amended)

US 10,055,453 B2

INTERACTIVE SEARCHING METHOD AND APPARATUS

CROSS REFERENCE TO RELATED APPLICATION

This application claims priority and benefits of Chinese Patent Application No. 201410326117.9, filed with State Intellectual Property Office on Jul. 9, 2014, the entire content of which is incorporated herein by reference.

FIELD

Embodiments of the present invention generally relate to an internet technology field, and more particularly, to an interactive searching method and an interactive searching apparatus.

BACKGROUND

With the constant development of technology, the search engine has been an indispensable part in life. Currently, in the interactive search of the conventional search engine, the user inputs a query, and the search engine returns search results associated with the query and sequences the search results from top to bottom according to their own correlations with the query. The query may include one or more key words. The user can browse and click the search results, and further select information or content that he is interested in or needs from the search results. If the user does not search out the information or content that satisfies his/her requirement based on the current query or he/she intends for more accurate search results, another query may be generated by adding a key word into the current query or changing a key word in the current query, thus performing a further search.

However, there are following defects in the related art. Adding a key word into the current query or changing a key word in the current query may change the search intention of the user. For example, for the query "nice movie", another query that may be input by the user includes: "nice 3D movie", "nice European and American movies", "nice horror movie", "nice movie of Zhang Yimou" and "nice art movie", in which the added key words are in different dimensions and the search results are also different, such that it is difficult for the user to obtain the useful information and content, thus resulting in a poor searching experience of the user.

SUMMARY

Embodiments of the present invention seek to solve at least one of the problems existing in the related art to at least some extent.

Accordingly, a first object of the present disclosure is to provide an interactive searching method, which clarifies a requirement of a user efficiently and makes it easy for the user to obtain useful information and content, thus improving a searching experience of the user.

A second object of the present disclosure is to provide an interactive searching apparatus.

In order to achieve objects, embodiments of a first aspect of the present disclosure provide an interactive searching method, including: obtaining, at one or more computing devices, a query from a webpage on a user device; and generating, at the one or more computing devices, intention clarification information of the query according to a history search log associated with the query and a predetermined semantic knowledge base, the intention clarification information configured to be displayed in the webpage on the user device.

With the interactive searching method according to embodiments of the present disclosure, the intention clarification information of the query is generated according to the history search log associated with the query and the semantic knowledge base and is displayed to the user via the client webpage, such that the requirement of the user may be clarified efficiently and it is easy for the user to obtain the useful information and content, thus improving the searching experience of the user.

In order to achieve objects, embodiments of a second aspect of the present disclosure provide an interactive searching apparatus, including: one or more computing devices configured to execute one or more software modules, the one or more software modules including: an obtaining module configured to obtain a query from a webpage on a user device; and a generating module configured to generate intention clarification information of the query according to a history search log associated with the query and a predetermined semantic knowledge base, the intention clarification information configured to be displayed in the webpage on the user device.

With the interactive searching apparatus according to embodiments of the present disclosure, the intention clarification information of the query is generated according to the history search log associated with the query and the semantic knowledge base and is displayed to the user via the client webpage, such that the requirement of the user may be clarified efficiently and it is easy for the user to obtain the useful information and content, thus improving the searching experience of the user.

Embodiments of a third aspect of the present disclosure provide a non-transitory computer-readable storage medium, including one or more programs for executing steps of: obtaining a query from a webpage on a user device; and generating intention clarification information of the query according to a history search log associated with the query and a predetermined semantic knowledge base, the intention clarification information configured to be displayed in the webpage on the user device.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which:

FIG. 1 is a flow chart of an interactive searching method according to an embodiment of the present disclosure;

FIG. 3 is a schematic diagram of an interaction effect of an interactive searching method according to an embodiment of the present disclosure.

DETAILED DESCRIPTION

Figure 2:
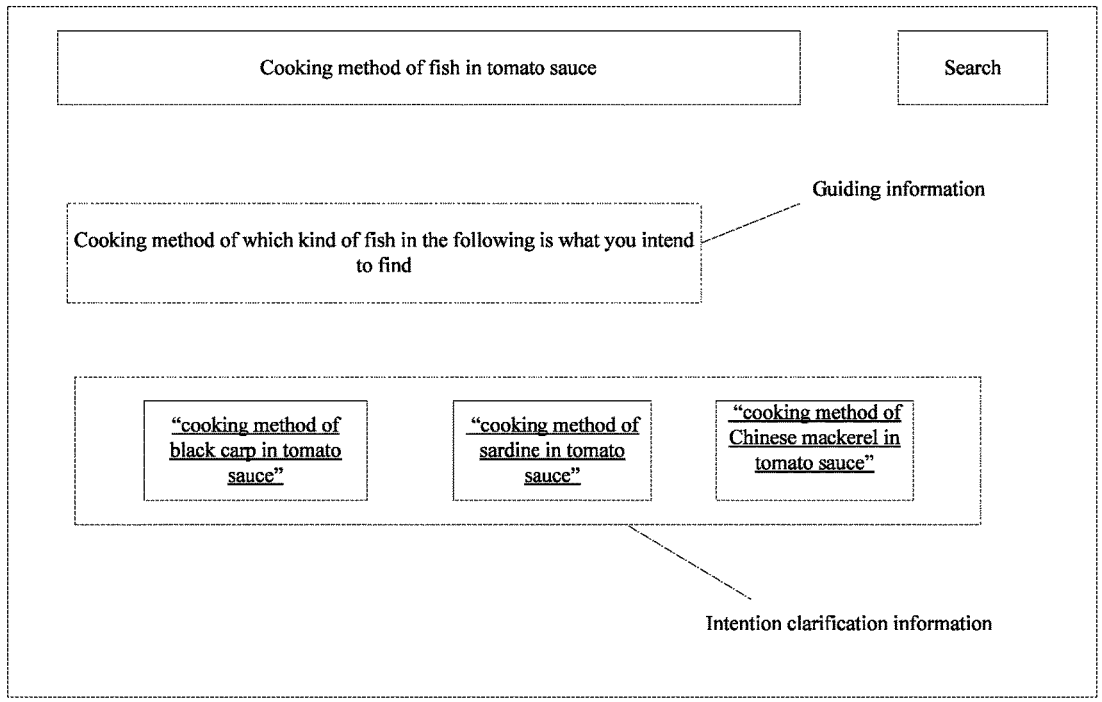
FIG. 2 is a schematic diagram of an interaction effect of an interactive searching method according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

An interactive searching method and an interactive searching apparatus according to embodiments of the present disclosure will be described in the following with reference to drawings.

FIG. 1 is a flow chart of an interactive searching method according to an embodiment of the present, in which the embodiment is described at a search engine side and an interactive search indicates that the search engine receives a search requirement of a user via a natural language and provides a search result to the user.

As shown in FIG. 1, the interactive searching method includes following steps.

At step S1, a query is obtained.

In an embodiment of the present disclosure, the query input by the user may be obtained, such as "nice movie" and "cooking method of fish in tomato sauce".

At step S2, intention clarification information of the query is generated according to a history search log associated with the query and a predetermined semantic knowledge base to display the intention clarification information on a client webpage in which the query is.

The semantic knowledge base may include a plurality of words having a semantic hypernym-hyponym relationship. For example, "furniture" is a hypernym of "wardrobe" and "fruit" is a hypernym of "apple". Correspondingly, "wardrobe" is a hyponym of "furniture" and "apple" is a hyponym of "fruit". The semantic knowledge base may also include a plurality of words having a semantic apposition relationship. For example, "apple", "banana", "ananas" and "grape" are appositive and have a common hypernym "fruit".

Specifically, the query may be segmented into at least one word, and a hyponym set of the at least one word is obtained according to the history search log associated with the at least one word and the semantic knowledge base and an interactive candidate configured to clarify a query intention is generated according to the hyponym set. Supposing that the query includes n terms, the query may be represented as $w_1, w_2, \ldots w_i, \ldots w_n$. If there is a query $w_1, w_2, \ldots w_{i-1}, x, w_{i+1}, \ldots w_n$ ($x \in H(w_i)$, where $H(w_i)$ is a hyponym set of $w_i$) in the history search log, it is indicated that the user may have detailed requirements for $w_i$ and x may be extracted as the interactive candidate configured to clarify the query intention. For example, if the query is "cooking method of fish in tomato sauce", $w_i$ is "fish". If the user has searched for "cooking method of black carp in tomato sauce", "cooking method of sardine in tomato sauce" and "cooking method of Chinese mackerel in tomato sauce", since "black carp", "sardine" and "Chinese mackerel" are hyponyms of "fish", "black carp", "sardine" and "Chinese mackerel" may be treated as the interactive candidates. Finally, as shown in FIG. 2, intention clarification information of the query "cooking method of fish in tomato sauce" is "cooking method of black carp in tomato sauce", "cooking method of sardine in tomato sauce" and "cooking method of Chinese mackerel in tomato sauce".

In addition, the query may be segmented into at least one word, and a sibling set of the at least one word is obtained according to the history search log associated with the at least one word and the semantic knowledge base and an interactive candidate configured to clarify a query intention is generated according to the sibling set. Supposing that the query includes n terms, the query may be represented as $w_1, w_2, \ldots w_i, \ldots w_n$. If there is a query $w_1, w_2, \ldots w_{i-1}, x, w_i, \ldots w_n$ ($x \in H(h)$, where $H(h)$ is a hyponym set of h) in the history search log, it is indicated that a term is added between $w_{i-1}$ and $w_i$, and x may be extracted as the interactive candidate configured to clarify the query intention. For example, the query is "nice movie", $w_{i-1}$ is "nice" and $w_i$ is "movie", and terms such as "horror", "love", "war" and "comedy" may be inserted between $w_{i-1}$ and $w_i$ and used as the interactive candidates. "Horror", "love", "war" and "comedy" have a common hypernym "type". Finally, as shown in FIG. 3, "nice horror movie", "nice love movie", "nice war movie" and "nice comedy movie" are the intention clarification information of "nice movie".

In an embodiment of the present disclosure, when the intention clarification information of the query is generated according to the history search log associated with the query and the semantic knowledge base, guiding information is generated to display the guiding information on a client webpage in which the query is. The client webpage is mainly configured to display the query, the search result, the intention clarification information and the guiding information.

Specifically, first information is obtained according to a configuration template, and second information is obtained according to a word set configured to generate the interactive candidate, and third information is obtained according to the query, and finally the first information, the second information and the third information are combined to form the guiding information, in which the word set includes the hyponym set and the sibling set.

In an embodiment of the present disclosure as shown in FIG. 2, the first information is a fixed content such as "what you intend to find" and may be implemented by the configuration template. The second information such as "which fish in the following" may be generated according to the word set configured to generate the interactive candidate. The third information such as "cooking method of" may be obtained according to the query. Finally, the first information, the second information and the third information are combined to form the guiding information "cooking method of which fish in the following is what you intend to find?".

In another embodiment of the present disclosure as shown in FIG. 3, the first information is a fixed content such as "what you intend to find" and may be implemented by the configuration template. The second information such as "which type in the following" may be generated according to the word set configured to generate the interactive candidate. The third information such as "movie of" may be obtained according to the query. Finally, the first information, the second information and the third information are combined to form the guiding information "which type of movie in the following is what you intend to find?".

Specifically, a hypernym of the hyponym set is obtained from the at least one word, and an interrogative set is matched with the hypernym according to a predetermined language model, and an expression with a highest probability of matching is obtained and treated as the second information. The predetermined language model may be denoted as $VE = QT + w_i$, in which VE is the second information; QT is the interrogative, such as which one, which kind, what and who; $w_i$ is the hypernym. For $w_i$, the matched interrogative is corresponding. For example, the interrogative QT corresponding to $w_i$ "fish" is "which kind" and the interrogative "which one" is not suitable for $w_i$ "fish". Thus, each candidate interrogative may be matched with $w_i$ to obtain the expression with the highest probability of matching and the expression with the highest probability of matching is treated as the second information. For example, the interrogative "which kind" and $w_i$ "fish" are combined to generate the second information "which kind of fish".

Certainly, a hypernym of the sibling set is obtained, and the interrogative set is matched with the hypernym according to the predetermined language model, and an expression with the highest probability of matching is obtained and treated as the second information. The predetermined language model may be denoted as VE=QT+h, in which VE is the second information; QT is the interrogative, such as which one, which kind, what and who; h is the hypernym. For h, the matched interrogative is corresponding. For example, the interrogative QT corresponding to h "type" is "which kind" and the interrogative "who" is not suitable for h "type". Thus, each candidate interrogative may be matched with h to obtain the expression with the highest probability of matching and the expression with the highest probability of matching is treated as the second information. For example, the interrogative "which kind" and h "type" are combined to generate the second information "which kind of type".

With the interactive searching method according to embodiments of the present disclosure, the intention clarification information of the query is generated according to the history search log associated with the query and the semantic knowledge base and is displayed to the user via the client webpage, such that the requirement of the user may be clarified efficiently and it is easy for the user to obtain the useful information and content, thus improving the searching experience of the user.

In order to achieve above embodiments of the present disclosure, an interactive searching apparatus is provided by embodiments of the present disclosure. The interactive searching apparatus can include a plurality of modules that may be executed by one or more computing devices.

Figure 4:
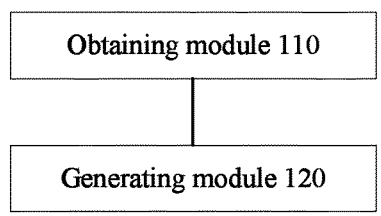
FIG. 4 is a block diagram of an interactive searching apparatus according to an embodiment of the present disclosure.

FIG. 4 is a block diagram of an interactive searching apparatus according to an embodiment of the present disclosure.

As shown in FIG. 4, the interactive searching apparatus includes: an obtaining module 110 and a generating module 120.

The obtaining module 110 is configured to obtain a query.

In an embodiment of the present disclosure, the obtaining module 110 obtains the query input by the user, such as "nice movie" and "cooking method of fish in tomato sauce".

The generating module 120 is configured to generate intention clarification information of the query according to a history search log associated with the query and a predetermined semantic knowledge base and to display the intention clarification information on a client webpage in which the query is.

The semantic knowledge base may include a plurality of words having a semantic hypernym-hyponym relationship. For example, "furniture" is a hypernym of "wardrobe" and "fruit" is a hypernym of "apple". Correspondingly, "wardrobe" is a hyponym of "furniture" and "apple" is a hyponym of "fruit". The semantic knowledge base may also include a plurality of words having a semantic apposition relationship. For example, "apple", "banana", "ananas" and "grape" are appositive and have a common hypernym "fruit".

Specifically, the generating module 120 segments the query into at least one word, obtains a hyponym set of the at least one word according to the history search log associated with the at least one word and the semantic knowledge base and generates an interactive candidate configured to clarify a query intention according to the hyponym set. Supposing that the query includes n terms, the query may be represented as $w_1, w_2, \ldots w_i, \ldots w_n$. If there is a query $w_1, w_2, \ldots w_{i-1}, x, w_{i+1}, \ldots w_n$ ($x \in H(w_i)$, where $H(w_i)$ is a hyponym set of $w_i$) in the history search log, it is indicated that the user may have detailed requirements for $w_i$, and x may be extracted as the interactive candidate configured to clarify the query intention. For example, if the query is "cooking method of fish in tomato sauce", $w_i$ is "fish". If the user has searched for "cooking method of black carp in tomato sauce", "cooking method of sardine in tomato sauce" and "cooking method of Chinese mackerel in tomato sauce", since "black carp", "sardine" and "Chinese mackerel" are hyponyms of "fish", "black carp", "sardine" and "Chinese mackerel" may be treated as the interactive candidates. Finally, as shown in FIG. 2, intention clarification information of the query "cooking method of fish in tomato sauce" is "cooking method of black carp in tomato sauce", "cooking method of sardine in tomato sauce" and "cooking method of Chinese mackerel in tomato sauce".

In addition, the generating module 120 segments the query into at least one word, obtains a sibling set of the at least one word according to the history search log associated with the at least one word and the semantic knowledge base and generates an interactive candidate configured to clarify a query intention according to the sibling set. Supposing that the query includes n terms, the query may be represented as $w_1, w_2, \ldots w_i, \ldots w_n$. If there is a query $w_1, w_2, \ldots w_{i-1}, x, w_i, \ldots w_n$ ($x \in H(h)$, where $H(h)$ is a hyponym set of h) in the history search log, it is indicated that a term is added between $w_{i-1}$ and $w_i$ and the generating module 120 may extract x as the interactive candidate configured to clarify the query intention. For example, the query is "nice movie", $w_{i-1}$ is "nice" and $w_i$ is "movie", and terms such as "horror", "love", "war" and "comedy" may be inserted between $w_{i-1}$ and $w_i$ and used as the interactive candidates. "Horror", "love", "war" and "comedy" have a common hypernym "type". Finally, as shown in FIG. 3, "nice horror movie", "nice love movie", "nice war movie" and "nice comedy movie" are the intention clarification information of "nice movie".

In an embodiment of the present disclosure, when the intention clarification information of the query is generated according to the history search log associated with the query and the semantic knowledge base, the generating module 120 generates guiding information to display the guiding information on a client webpage in which the query is. The client webpage is mainly configured to display the query, the search result, the intention clarification information and the guiding information.

Specifically, the generating module 120 obtains first information according to a configuration template, obtains second information according to a word set configured to generate the interactive candidate, obtains third information according to the query, and combines the first information, the second information and the third information to form the guiding information finally, in which the word set includes the hyponym set and the sibling set.

In an embodiment of the present disclosure as shown in FIG. 2, the first information is a fixed content such as "what you intend to find" and may be implemented by the configuration template. The second information such as "which fish in the following" may be generated according to the word set configured to generate the interactive candidate. The third information such as "cooking method of" may be obtained according to the query. Finally, the generating module 120 combines the first information, the second information and the third information to form the guiding information "cooking method of which fish in the following is what you intended to find?".

In another embodiment of the present disclosure as shown in FIG. 3, the first information is a fixed content such as "what you intend to find" and may be implemented by the configuration template. The second information such as "which type in the following" may be generated according to the word set configured to generate the interactive candidate. The third information such as "movie of" may be obtained according to the query. Finally, the generating module 120 combines the first information, the second information and the third information to form the guiding information "which type of movie in the following is what you intend to find?".

Specifically, the generating module 120 may obtain a hypernym of the hyponym set from the at least one word, and match an interrogative set with the hypernym according to a predetermined language model, and obtain an expression with a highest probability of matching and treat the expression with the highest probability of matching as the second information. The predetermined language model may be denoted as VE=QT+$w_i$, in which VE is the second information; QT is the interrogative, such as which one, which kind, what and who; $w_i$ is the hypernym. For $w_i$, the matched interrogative is corresponding. For example, the interrogative QT corresponding to $w_i$ "fish" is "which kind" and the interrogative "which one" is not suitable for $w_i$ "fish". Thus, each candidate interrogative may be matched with $w_i$ to obtain the expression with the highest probability of matching and the expression with the highest probability of matching is treated as the second information. For example, the interrogative "which kind" and $w_i$ "fish" are combined to generate the second information "which kind of fish".

Certainly, the generating module 120 may obtain a hypernym of the sibling set, and match the interrogative set with the hypernym according to the predetermined language model, and obtain an expression with the highest probability of matching and treat the expression with the highest probability of matching as the second information. The predetermined language model may be denoted as VE=QT+h, in which VE is the second information; QT is the interrogative, such as which one, which kind, what and who; h is the hypernym. For h, the matched interrogative is corresponding. For example, the interrogative QT corresponding to h "type" is "which kind" and the interrogative "who" is not suitable for h "type". Thus, each candidate interrogative may be matched with h to obtain the expression with the highest probability of matching and the expression with the highest probability of matching is treated as the second information. For example, the interrogative "which kind" and h "type" are combined to generate the second information "which kind of type".

With the interactive searching apparatus according to embodiments of the present disclosure, the intention clarification information of the query is generated according to the history search log associated with the query and the semantic knowledge base and is displayed to the user via the client webpage, such that the requirement of the user may be clarified efficiently and it is easy for the user to obtain the useful information and content, thus improving the searching experience of the user.

A non-transitory computer-readable storage medium is provided by embodiments of the present disclosure, including one or more programs for executing steps of: obtaining a query; and generating intention clarification information of the query according to a history search log associated with the query and a predetermined semantic knowledge base to display the intention clarification information on a client webpage in which the query is.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art. The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented interactive searching method, comprising:
    obtaining, at one or more computing device, a query from a webpage on a user device; and
    generating, at the one or more computing device, intention clarification information of the query according to a history search log associated with the query and a predetermined semantic knowledge base, the intention clarification information configured to be displayed in the webpage on the user device and including at one least candidate query related to the query; and
    generating, at the one or more computing device, guiding information, the guiding information configured to be displayed in the webpage on the user device and including at least one question related to the query from the webpage on the user device;
    wherein the semantic knowledge base comprises a plurality of words having a semantic hypernym-hyponym relationship and/or a semantic sibling relationship;
    wherein the step of generating an intention clarification information comprises:
        segmenting, at the one or more computing device, the query into at least one word;
        obtaining, at the one or more computing device, a hyponym set and/or sibling set of the at least one word according to the history search log associated with the at least one word and the semantic knowledge base;
        generating, at the one or more computing device, interactive candidates configured to clarify a query intention according to the hyponym set and/or sibling set; and
        combining, at the one or more computing device, the interactive candidates to form the at one least candidate query; and wherein the step of generating guiding information comprises:
        obtaining, at the one or more computing device, first information according to a configuration template;
        obtaining, at the one or more computing device, second information according to a word set configured to generate the interactive candidate;
        obtaining, at the one or more computing device, third information according to the query, in which the word set comprises the hyponym set and the sibling set; and
        combining, at the one or more computing device, the first information, the second information and the third information to form the guiding information;
    wherein obtaining second information according to a word set configured to generate the interactive candidate comprises:
        obtaining, at the one or more computing device, one or more of the following: a hypernym of the hyponym set from the at least one word and a hypernym of the sibling set;
        matching, at the one or more computing device, an interrogative set with the hypernym according to a predetermined language model;
        obtaining, at the one or more computing device, an expression with a highest probability of matching; and
        treating, at the one or more computing device, the expression with the highest probability of matching as the second information.

2. The method according to claim 1, wherein the query from the webpage is an internet search query performed by a web search engine.

3. The method according to claim 2, wherein the intention clarification information is an updated internet search query that is narrower in scope than the internet search query.

4. The method according to claim 3, wherein the at least one candidate query is a narrower search query than the query.

5. An interactive searching apparatus, including:
    one or more processors configured to execute one or more software modules, the one or more software modules including:
        an obtaining module configured to obtain a query from a webpage on a user device; and
        a generating module configured to generate intention clarification information of the query according to a history search log associated with the query and a predetermined semantic knowledge base, the intention clarification information configured to be displayed in the webpage on the user device and including at one least candidate query related to the query;
    wherein the generating module is further configured to:
        generate guiding information, the guiding information configured to be displayed in the webpage on the user device and including at least one question related to the query from the webpage on the user device;
        obtain first information according to a configuration template;
        obtain second information according to a word set configured to generate the interactive candidate;
        obtain one or more of the following: a hypernym of the sibling set and a hypernym of the hyponym set from the at least one word;
        match an interrogative set with the hypernym according to a predetermined language model;

obtain an expression with a highest probability of matching;

treat the expression with the highest probability of matching as the second information;

obtain third information according to the query, in which the word set comprises the hyponym set and the sibling set;

combine the first information, the second information and the third information to form the guiding information;

segment the query into at least one word;

obtain a hyponym set and/or sibling set of the at least one word according to the history search log associated with the at least one word and the semantic knowledge base;

generate interactive candidates configured to clarify a query intention according to the hyponym set and/or sibling set;

combine the interactive candidates to form the at one least candidate query; and wherein the semantic knowledge base comprises a plurality of words having a semantic hypernym-hyponym relationship and/or a semantic apposition relationship.

6. The method according to claim 5, wherein the query from the webpage is an internet search query performed by a web search engine.

7. The method according to claim 6, wherein the intention clarification information is an updated internet search query that is narrower in scope than the internet search query.

8. The method according to claim 7, wherein the at least one candidate query is a narrower search query than the query.

9. A non-transitory computer-readable storage medium, comprising one or more programs for executing steps of:

obtaining a query from a webpage on a user device; and generating intention clarification information of the query according to a history search log associated with the query and a predetermined semantic knowledge base, the intention clarification information configured to be displayed in the webpage on the user device and including at one least candidate query related to the query; and generating, at the one or more computing device, guiding information, the guiding information configured to be displayed in the webpage on the user device and including at least one question related to the query from the webpage on the user device;

wherein the semantic knowledge base comprises a plurality of words having a semantic hypernym-hyponym relationship and/or a semantic sibling relationship;

wherein the step of generating an intention clarification information comprises:

segmenting, at the one or more computing device, the query into at least one word;

obtaining, at the one or more computing device, a hyponym set and/or sibling set of the at least one word according to the history search log associated with the at least one word and the semantic knowledge base;

generating, at the one or more computing device, an interactive candidate configured to clarify a query intention according to the hyponym set and/or sibling set;

combining, at the one or more computing device, the interactive candidates to form the at one least candidate query; and wherein the step of generating guiding information comprises:

obtaining, at the one or more computing device, first information according to a configuration template;

obtaining, at the one or more computing device, second information according to a word set configured to generate the interactive candidate, wherein obtaining second information includes:

obtaining one or more of the following: a hypernym of the hyponym set from the at least one word and a hypernym of the sibling set;

matching an interrogative set with the hypernym according to a predetermined language model;

obtaining an expression with a highest probability of matching; and treating the expression with the highest probability of matching as the second information;

obtaining, at the one or more computing device, third information according to the query, in which the word set comprises the hyponym set and the sibling set; and combining, at the one or more computing device, the first information, the second information and the third information to form the guiding information.

* * * * *